US008038757B2

(12) United States Patent
Bardon et al.

(10) Patent No.: US 8,038,757 B2
(45) Date of Patent: Oct. 18, 2011

(54) FILTERING BLOCK WITH FINS FOR FILTERING PARTICLES CONTAINED IN AN INTERNAL COMBUSTION ENGINE EXHAUST GASES

(75) Inventors: Sébastien Bardon, Lyons (FR); Bernard Bouteiller, Orleans (FR)

(73) Assignee: Saint Gobain Centre de Recherches et d'Etudes Europeen, Courbevoie (FR)

( * ) Notice: Subject to any disclaimer, the term of this patent is extended or adjusted under 35 U.S.C. 154(b) by 653 days.

(21) Appl. No.: 11/660,915

(22) PCT Filed: Aug. 22, 2005

(86) PCT No.: PCT/FR2005/002117
§ 371 (c)(1),
(2), (4) Date: Mar. 13, 2008

(87) PCT Pub. No.: WO2006/024792
PCT Pub. Date: Mar. 9, 2006

(65) Prior Publication Data
US 2008/0264012 A1   Oct. 30, 2008

(30) Foreign Application Priority Data
Aug. 25, 2004   (FR) ...................................... 04 09083

(51) Int. Cl.
*B01D 39/06* (2006.01)
(52) U.S. Cl. ........................................................ 55/523

(58) Field of Classification Search ............ 55/522–524; 422/172, 177–182; 60/297; 502/303
See application file for complete search history.

(56) References Cited

U.S. PATENT DOCUMENTS

| 4,364,761 | A | 12/1982 | Berg et al. | |
|---|---|---|---|---|
| 4,740,408 | A * | 4/1988 | Mochida et al. | 428/116 |
| 4,767,309 | A | 8/1988 | Mizuno et al. | |
| D534,264 | S | 12/2006 | Komori et al. | |
| 7,410,929 | B2 * | 8/2008 | Ichikawa et al. | 502/300 |
| 2004/0037754 | A1 | 2/2004 | van Setten et al. | |
| 2005/0011174 | A1* | 1/2005 | Hong et al. | 55/523 |
| 2005/0016141 | A1* | 1/2005 | Hong et al. | 55/523 |

FOREIGN PATENT DOCUMENTS

| DE | 100 37 403 | 2/2002 |
|---|---|---|
| EP | 0 879 938 | 11/1998 |
| FR | 2 840 545 | 12/2003 |
| WO | WO2004024293 | * 3/2004 |

* cited by examiner

*Primary Examiner* — Duane Smith
*Assistant Examiner* — Amber Orlando
(74) *Attorney, Agent, or Firm* — Young & Thompson

(57) ABSTRACT

A block for filtering particles contained in an internal combustion engine exhaust gases, includes overlapping assemblies of adjacent input channels (14e) and output channels (14s), the input and output channels being alternately arranged so as to form, in cross-section, a checkered pattern, the overall volume of the input channels (14e) being greater than that of the output channels (14s). The filtering block is characterized in that at least one inner space (20e, 20s) of one channel (14e, 14s) includes at least one inner fin (30).

17 Claims, 4 Drawing Sheets

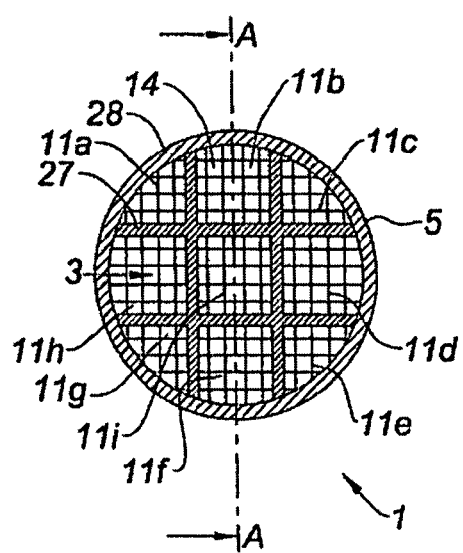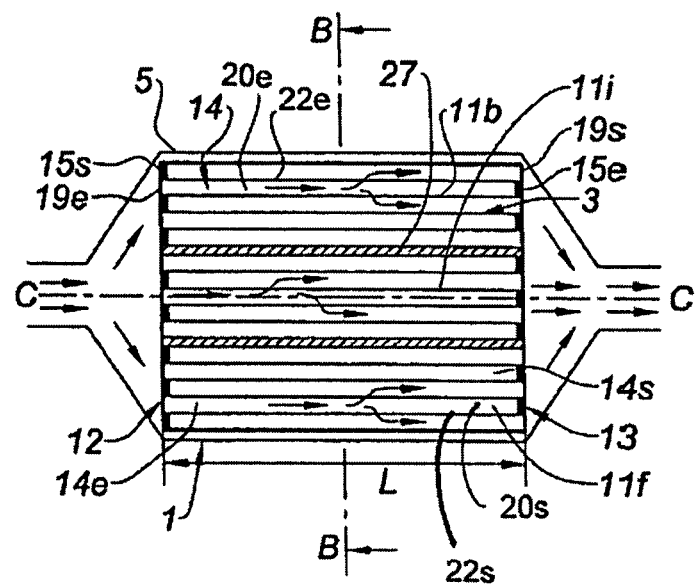
Fig. 1
Fig. 2

FILTERING BLOCK WITH FINS FOR FILTERING PARTICLES CONTAINED IN AN INTERNAL COMBUSTION ENGINE EXHAUST GASES

The invention relates to a filter block for filtering particles contained in the exhaust gas from internal combustion engines, in particular of the diesel type, and to a filter body comprising at least one filter block in accordance with the invention.

Conventionally, before being evacuated to the atmosphere, exhaust gases may be purified using a prior art particle filter as shown in FIGS. 1 and 2.

A particle filter 1 is shown in FIG. 1 in cross section in the plane of section B-B shown in FIG. 2, and in FIG. 2 in longitudinal section in the plane of section A-A shown in FIG. 1.

The particle filter 1 conventionally comprises at least one filter body 3, inserted into a metal envelope 5. The filter body 3 is produced by assembling and machining a plurality of blocks 11 with reference numerals 11a-11i.

To fabricate a block 11, a ceramic material (cordierite, silicon carbide, etc) is extruded to form a porous honeycomb structure. Conventionally, the extruded porous structure has the form of a rectangular parallelepiped extending between two faces, the upstream 12 and the downstream 13 face, which are substantially square, onto which a plurality of adjacent, rectilinear and parallel channels 14 open.

After extrusion, the extruded pore structures are plugged in alternation on the upstream face 12 or the downstream face 13 by upstream 15s and downstream 15e plugs respectively, as is well known, to form channels of the "outlet channel" 14s and "inlet channel" 14e type respectively. At the end of the outlet channels 14s and inlet channels 14e opposite to the upstream 15s and downstream 15e plugs respectively, the outlet channels 14s and inlet channels 14e open to the outside via outlet openings 19s and inlet openings 19e respectively extending over the downstream 13 and upstream 12 faces respectively.

The inlet channels 14e and outlet channels 14s thus define inside spaces 20e and 20s defined by a side wall 22e and 22s, a closing plug 15e and 15s and an opening 19s or 19e opening to the outside, respectively. Two adjacent inlet channels 14e and outlet channels 14s channels are in fluid communication via the common portion of their side walls 22e and 22s, below termed the "common portion 22".

Blocks 11a-11i are assembled together by bonding using seals 27 of ceramic cement generally constituted by silica and/or silicon carbide and/or aluminum nitride. The assembly produced may then be machined in order, for example, to produce a round cross section. Thus, the exterior blocks 11a, 11b, 11c, 11d, 11e, 11f, 11g, 11h have an external face rounded by machining.

This produces a cylindrical filter body 3 with a longitudinal axis C-C, which may be inserted into the envelope 5, a peripheral seal 28, which is sealed to exhaust gas, being disposed between the exterior filter blocks 11a-11h and the envelope 5.

The arrows in FIG. 2 indicate that the flow F of exhaust gas enters the filter body 3 via the openings 19e in the inlet channels 14e, then traverses the side filter walls of said channels to join the outlet channels 14s, then escapes outside via the openings 19s.

After a certain service time, particles or "soot" accumulated in the inlet channels 14e of the filter body 3 change the performance of the engine. For that reason, the filter body 3 must be regenerated regularly, for example every 500 kilometers. Regeneration, known as "cleaning", consists of oxidizing the soot by heating it to a temperature allowing it to burn off.

During regeneration stages, the temperatures in the various zones of the filter body 3 differ and do not vary uniformly.

The exhaust gas transports heat energy released by soot combustion downstream. Further, the soot is not deposited uniformly in the various channels, for example it accumulates, preferentially in the zone of the filter close to its longitudinal axis, also termed the "core" of the filter body. The combustion zones are thus not uniformly distributed in the filter body 3. Soot combustion thus causes temperature rise in the core of the filter body which is greater than that in the peripheral zones. Finally, the peripheral zones of the filter body 3 are cooled through the metal envelope 5 by the surrounding air.

The non-uniformity in the temperatures inside the filter body 3, and the differences in the nature of the materials used for the filter blocks 11a-11i and the seals 27 generate local, high amplitude stresses which may result in breaks or local cracking. In particular, the local stresses at the interfaces between the blocks 11a-11h and the envelope 5 and between the blocks 11a-11i and the joins 27 may result in cracks inside the blocks 11a-11i, thereby reducing the service life of the particle filter 1.

To limit the risk of such cracks appearing, it is known to select the cement of the seal as a function of its capacity to ensure cohesion of the filter blocks and its thermal conductivity. As an example, International patent application WO-A-01/23069 from Ibiden proposes the use of a seal of thickness selected so as to be in the range 0.3 mm [millimeter] to 3 mm and constitutes a cement with a thermal conductivity in the range 0.1 W/m·K [watts/meter·K] to 10 W/m·K. Said seal does not, however, completely overcome the risk of the appearance of cracks.

Similarly, U.S. patent US-A-2004/037754 describes a filter body comprising imbricated assemblies of adjacent inlet channels and outlet channels, disposed in an alternating manner to form a checkerboard pattern in section. The overall volume of the inlet channels is substantially identical to that of the outlet channels. The inside spaces of certain inlet and/or outlet channels have fins intended to receive a catalyst. Said fins have the advantage of increasing the total area of the side walls defining the channels, while substantially maintaining the filter area. US-A-2004/037754 does not define the conditions under which the fins could have an effect on the presence of cracks.

The aim of the invention is to provide novel filter bodies and blocks that can further reduce the risk of cracks and increase the total available area, for example to fix therein a catalyst, without substantially reducing the filter area.

In accordance with the invention, this aim is achieved by a filter block for filtering particles contained in the exhaust gas from an internal combustion engine, comprising imbricated assemblies of adjacent inlet channels and outlet channels, said inlet channels and outlet channels being disposed in an alternating manner to form a checkerboard pattern in section, the overall volume of said inlet channels being greater than that of said outlet channels. The block of the invention is remarkable in that at least one inside space of one of said channels includes at least one internal fin.

The term "fin" means a fixed element on a side wall of an inlet channel or outlet channel and having a thermal conductivity that is higher than that of the exhaust gas. A fin may have any form: partition, plate, sheet, etc.

The presence of fins in certain channels facilitates radial thermal conductivity, the fins by definition forming preferred routes for evacuating heat. Heat is thus evacuated more rapidly than with a prior art filter block and the temperature differences between the core and the periphery of the filter are limited. Thermo-mechanical stresses, which may be the source of cracks in the seals and/or in the filter blocks, are thus reduced and the service life of the particle filter is increased.

In accordance with other preferred characteristics of the invention:

the thickness "Ea" of the internal fin, measured in meters in a cross section, which thickness is preferably constant, satisfies the following expression:

$$Ea \leq 0.39*p - 0.7*((2*E_{pf}) - E_{pf}^2)$$

in which:

"$E_{pf}$" denotes the mean thickness of the filter walls of the channel including said fin, measured in meters in said cross section;

"p" is the pitch of the array of channels of the block, measured in meters in said cross section;

said fin is substantially planar and preferably extends in a longitudinal plane;

said fin defines a continuous surface and/or is formed integrally with the material of the side wall of said channel;

said fin or fins partition said inside space, i.e. separate it into a plurality of inside sub-spaces;

all the inside spaces of the inlet channels, but of the inlet channels only, include at least one fin;

at least one intermediate wall separating two horizontal or vertical rows of said channels has a cross-sectional shape that is undulating, preferably sinusoidal. Preferably, all of the intermediate walls separating two vertical or horizontal rows of channels have a shape that is undulating, preferably sinusoidal;

the thickness "Ea" of the internal fin, measured in meters in said cross section, which thickness is preferably constant, satisfies the following expression:

$$Ea \leq p - E_{pf} - [420*p^2/(1A)]$$

in which:

"$E_{pf}$" and "p" have the meanings given above; and

"A" denotes the degree of asymmetry in said cross section;

the thickness "Ea" of the internal fin (30) is less than or equal to the mean thickness "$E_{pf}$" of the filter walls of the channel including said fin;

the filter block includes a plurality of fins extending from a junction line, said fins preferably being disposed equi-angularly about the junction line;

the set of internal fins of a channel has the form of an X, viewed in cross section, the ends of each of the four branches of the X each being in contact with a corner of said channel.

The invention also provides a filter body intended for a particle filter which is remarkable in that it comprises at least one filter block of the invention.

The following description made with reference to the accompanying drawings and examples provides a better understanding and appreciation of the advantages of the invention. In the drawings:

FIG. 1 shows a prior art particle filter in cross section taken along the plane of section B-B shown in FIG. 2;

FIG. 2 is the same particle filter taken along the longitudinal plane of section A-A shown in FIG. 1;

Figure 3A:
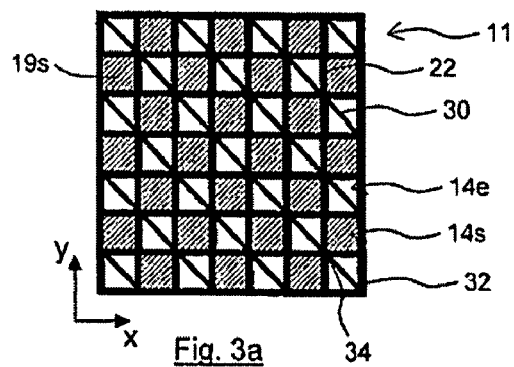
Figure 3B:
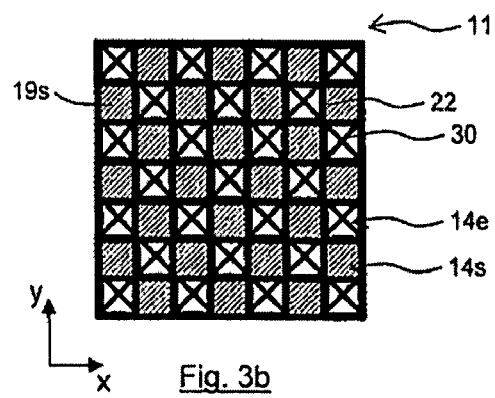
Figure 3C:
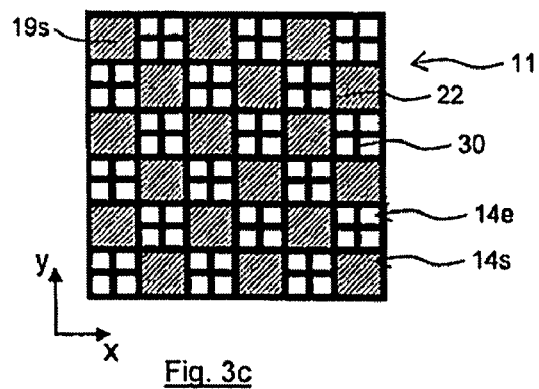
Figure 3D:
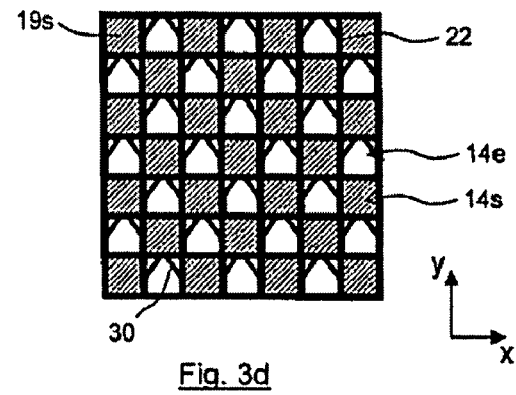
Figure 3E:
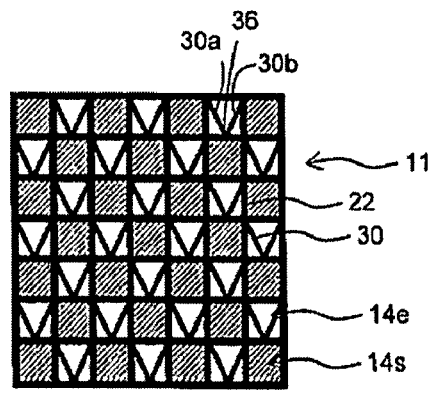
Figure 3F:
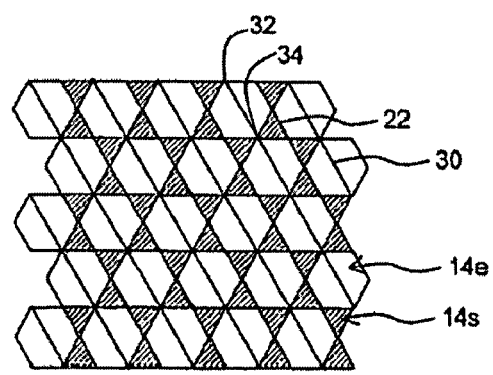
Figure 4:
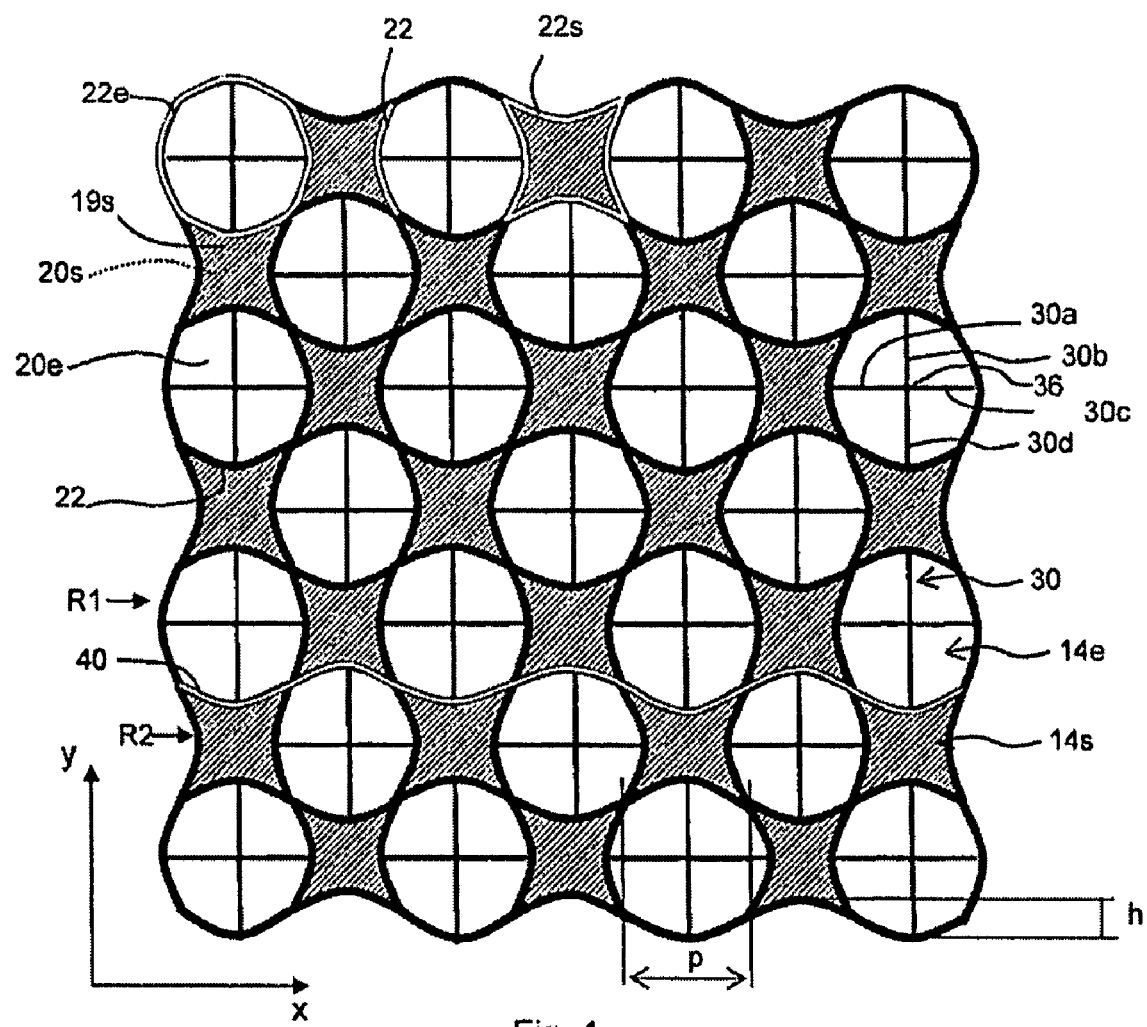
Figure 5:
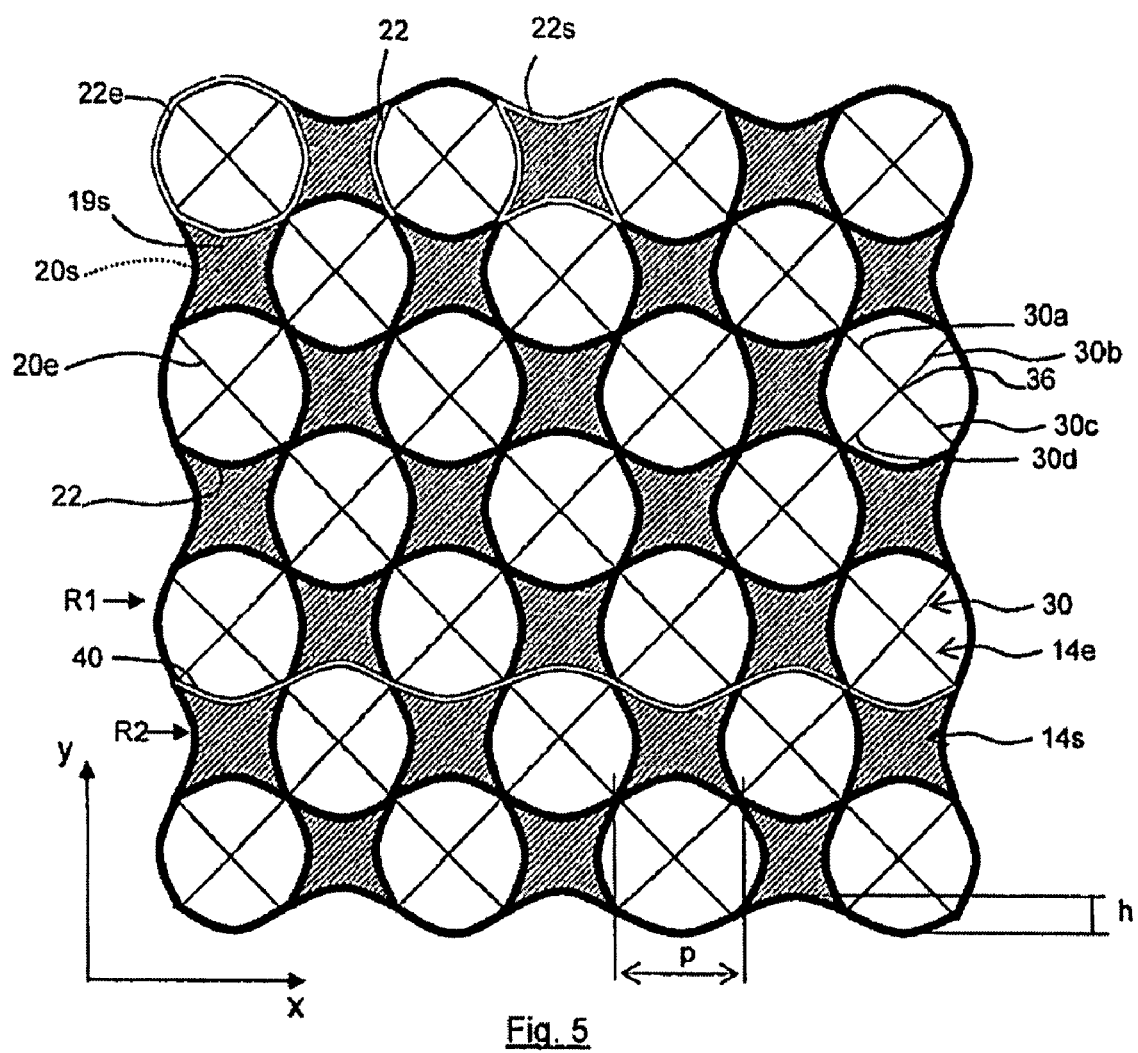

FIGS. 3a to 3f, 4, and 5 show the upstream face of filter blocks or parts of filter blocks to illustrate different possible arrangements of fins, the blocks of FIGS. 3e, 4, and 5 being in accordance with the invention, a preferred implementation being shown in FIG. 5.

To improve the clarity of the figures, the number of channels shown is much smaller than that found in conventional commercial filter blocks.

In the figures, which are non-limiting in nature, the various elements are not necessarily shown on the same scale. In particular, the thicknesses of the fins and the walls separating the various channels are not to scale and do not constitute a limitation of the invention.

Identical reference numerals are used in the various figures to designate identical or similar elements.

FIGS. 1 and 2 are described in the introduction; the description below refers to FIGS. 3a-3f and 4.

The block 11 comprises assemblies of adjacent inlet channels 14e and outlet channels 14s, arranged relative to each other so that all of the gas filtered by any inlet channel passes into the outlet channels adjacent to said inlet channel. Advantageously, there exist no zone(s) of one or more inlet channel(s) that open into another inlet channel, since such zone(s) could not be useful for filtering since the exhaust gases could pass through in either direction. This optimizes the available filter area (i.e. the area of the walls of the inlet channels through which the gas flow to be filtered can pass) for a predetermined volume of filter block.

Preferably, the inlet channels 14e and outlet channels 14s are parallel and rectilinear along the length L of the filter block. Advantageously, it is then possible to fabricate the honeycomb structure suitable for fabricating a filter block of the invention by extrusion.

The assemblies of inlet channels 14e and outlet channels 14s are imbricated one into the other so as to form, in cross section, a checkerboard motif in which said inlet channels 14e alternate with said outlet channels 14s in the height direction (y direction) and in the width direction (x direction). The side wall 22e of an inlet channel 14e is thus formed from the common portions of the wall 22 separating the inside volume of said channel 14e from the inside volumes 20s of the adjacent outlet channels. Similarly, the side wall 22s of an outlet channel 14s is formed from the common portions of wall 22 separating the inside volume 20s of said channel 14s from the inside volumes 20e of the adjacent inlet channels (see FIG. 4).

In accordance with the invention, at least one of the channels includes a fin 30. FIGS. 3a to 3f, and 4 show different possible forms for the fins 30. Any combination of the embodiments shown may also be envisaged.

Unlike the common portions of walls 22 which separate the outlet and inlet channels, and which are thus in contact with the non filtered exhaust gas moving in the inlet channels and with the filtered exhaust gas moving in the outlet channels, a fin 30 is only in contact with non filtered gas or with filtered gas depending on whether said fin 30 is in the inside space 20e of an inlet channel or in the inside space 20s of an outlet channel respectively.

The form of a fin 30 is not limiting. A fin may be curved or, as is preferable, planar, it may be discontinuous, i.e. have "holes" or, preferably, continuous, extending over only a portion of the channel or, as is preferable, it may extend over the entire length L of the channel, it may be fixed to the side wall by fixing points or, as is preferable, by one or more fixing lines.

When a fin 30 is fixed to a side wall at a plurality of fixing points, it advantageously contributes to the rigidity of the filter block 11. For equivalent rigidity, the thickness of the channel walls may thus be reduced. Advantageously, the filter areas of the channels are thereby increased. Further, the inside spaces of the channels are also increased, which limits the pressure drop across the filter block and, as regards the inlet channels, increases the volume available for storing soot.

Thus, the period between regenerations may be increased and the service life, linked to the residue storage capacity, is increased.

To optimize the effect of a fin 30 on the rigidity of the block 11, it is preferable for the fin 30 to be substantially planar and fixed along two fixing lines 32 and 34 to the side wall of the channel in which it extends (see FIG. 3a). Positioning of the fixing lines is determined so as to optimize resistance to mechanical stress and/or heat evacuation.

It is also preferable for the fin 30 to extend substantially longitudinally, preferably over the entire length L of the block. This facilitates fabrication of the block by extrusion, the fin 30 then being formed in one piece with the material of the side wall of the channel within which it extends.

As can be seen in FIG. 4, a channel may contain one or more fins 30a-30d, preferably connected together by junction lines 36 extending substantially along the axis of the channel. Preferably, fins 30a-30d are disposed equi-angularly about that axis.

As can be seen in FIG. 3e, the junction lines 36 between different fins 30a and 30b may also form a fixing line with the side wall of the channel.

Preferably, as can be seen in FIGS. 3a-3f, and 4, all of the inlet channels 14e are provided with identical fin means. Preferably again, all of the outlet channels 14a are provided with identical fin means, which are identical to or different from the fin means in the inlet channels 14e.

In a variation of the invention in which the filter block 11 is intended for use as a catalyst support, the fins 30 are covered with a catalyst. The presence of fins 30 thus increases the quantity of support available for the catalyst. In certain applications, for example for the treatment of oxides of nitrogen, $NO_x$, the efficiency of the filter block is a function of the contact area between the gas and the catalyst. The increase in the area carrying the catalyst resulting from the presence of the fins 30 is thus of particular advantage.

Since the fins 3 are by definition not filter walls, soot and ash deposits on the fins are low. Catalyst deposited on the fins is thus subjected to lower temperatures than the catalyst deposited on the filter side walls. Further, soot/catalyst or ash/catalyst chemical interactions are reduced (less corrosion). Advantageously the service life of the catalyst is thus significantly increased.

In this variation, the fins 30 are preferably disposed only in the inlet channels 14e, preferably in all of the inlet channels 14e.

Regardless of the variation, as can be seen in FIGS. 3f and 4, and in accordance with the invention, the cross section of the inlet channels is greater than that of the outlet channels 14s to increase the volume available for storing residues. Advantageously, the cleaning frequency of the filter is thereby reduced.

As can be seen in FIG. 4, the common portions of the walls may be deformed to increase the overall volume of the inlet channels 14e to the detriment of that of the outlet channels 14s. As an example, a common portion 22 between an inlet channel 14e and an outlet channel 14s may be concave on the side of the inlet channel 14e and convex on the side of the outlet channel 14s.

Preferably, a non-planar intermediate wall 40 separating two horizontal rows R1 and R2 of channels (and thus formed by a set of common portions 22 of the side walls of said channels) or separating two vertical channels is concave on the side of the inlet channels 14e and convex on the side of the outlet channels 14s.

By following a horizontal row (along the x axis) or a vertical row (along the y axis) of the channels, the intermediate wall 40 preferably has a constant thickness and preferably, in cross section, has a shape that is undulating or wavy, the intermediate wall 40 undulating substantially by an undulation half-length over the width of the channel.

The term "length" of an undulation means the distance separating two points of that undulation located at the same height with the same direction of variation of slope. With a periodic undulation, the "length" of the undulation is termed the "period".

The undulation is periodic and the amplitude of the undulations is constant. The undulation has a sinusoidal form the half-period of which is equal to the pitch "p" of the channel array, as can be seen in FIG. 4.

Finally, and preferably, all of the intermediate walls 40 of a block extending vertically or horizontally have an undulation of identical shape in cross section.

The degree of asymmetry "A" denotes the ratio between the half amplitude "h" and the half length of said undulation, i.e. for a periodic undulation, the ratio between the half amplitude "h" and the half-period. It is expressed in Table 1 as a percentage of that half-length:

$A = h/2 \times (1/p)$

The following examples, summarized in Table 1, are provided by way of non-limiting examples.

Example *1 represents the reference block, comprising a square structure and free of fins.

The particular blocks studied include a "wavy" structure, the intermediate walls undulating sinusoidally by a half-period over the width of one channel. All of the inlet channels include internal fins in the form of an X, similar to those shown in FIG. 5. Each inside space 20e is thus partitioned into four portions substantially of the same volume. None of the outlet channels includes a fin.

The channel density "Dc", as the number of channels per square inch (cpsi), the thickness of the filter walls "$E_{pf}$", the degree of asymmetry "A", and the thickness of the fins "Ea" are given in Table 1. The following abbreviations are used in Table 1 below:

CATarea: total area of the walls of the inlet channels, including the area of the fins. It is preferable for said area to be high when it is intended to be covered by a catalyst. The effect of the catalyst is increased thereby. A high total area also encourages thermal exchange between the gas from combustion and the block, and thus heat evacuation. The risk of cracking is thus advantageously limited;

OFA: the sections of the inlet channels. This area is representative of the volume of the inlet channels and thus of the storage capacity for the generated residues of combustion (the part of the soot which does not burn and non-combustible residues emitted by the engine);

FA: filter area. A filter block clogs more slowly when the filter area is high. Further, for an identical level of clogging, the induced pressure drop is lower when the filter block has a high filter area; and Dp: pressure drop on passing through the filter block, for given flow rate and temperature.

All of the values V of Table 1, namely FA, CATarea, OFA and Dp, are relative values given as percentages, obtained with a particular block compared with the reference block:

$V = ((V\text{calculated} - V\text{reference})/V\text{reference}) \times 100$, in which:

Vcalculated is the calculated theoretical value for the particular block; and

Vreference is the calculated theoretical value for the reference block.

TABLE 1

|  | Dc (cpsi) | $E_{pf}$ (μm) | A (%) | p (mm) | Ea (μm) | MAX1 (μm) | MAX2 (μm) | FA (%) | CAT area (%) | OFA (%) | Dp (%) |
|---|---|---|---|---|---|---|---|---|---|---|---|
| *1 | 180 | 380 | — | 1.9 | — | — | — | 100 | 100 | 100 | 100 |
| *2 | 180 | 350 | 7 | 1.9 | — | — | — | 108 | 108 | 132 | 100 |
| 3 | 112 | 150 | 20 | 2.4 | 100 | 234 | 726 | 102 | 236 | 147 | 107 |
| *4 | 112 | 150 | 14 | 2.4 | 150 | 128 | 726 | 95 | 218 | 170 | 60 |
| 5 | 122 | 150 | 12 | 2.3 | 50 | 166 | 687 | 102 | 234 | 178 | 51 |
| 6 | 122 | 150 | 14 | 2.3 | 50 | 201 | 687 | 100 | 238 | 136 | 61 |
| 7 | 122 | 150 | 14 | 2.3 | 100 | 201 | 687 | 100 | 232 | 158 | 65 |
| 8 | 122 | 250 | 18 | 2.3 | 100 | 167 | 547 | 100 | 232 | 172 | 145 |
| *9 | 122 | 250 | 18 | 2.3 | 200 | 167 | 547 | 95 | 222 | 113 | 154 |
| 10 | 133 | 150 | 20 | 2.2 | 100 | 356 | 648 | 106 | 255 | 117 | 128 |
| 11 | 133 | 150 | 20 | 2.2 | 150 | 356 | 648 | 109 | 249 | 185 | 132 |
| *12 | 133 | 200 | 6 | 2.2 | 100 | 82 | 578 | 95 | 223 | 112 | 65 |
| 13 | 161 | 250 | 10 | 2 | 100 | 223 | 430 | 103 | 246 | 141 | 116 |
| 14 | 161 | 250 | 8 | 2 | 100 | 194 | 430 | 102 | 243 | 133 | 109 |
| 15 | 161 | 250 | 14 | 2 | 150 | 276 | 430 | 104 | 244 | 148 | 148 |
| *16 | 161 | 250 | 8 | 2 | 250 | 194 | 430 | 91 | 219 | 106 | 133 |
| 17 | 161 | 300 | 10 | 2 | 100 | 173 | 360 | 101 | 240 | 134 | 137 |
| *18 | 161 | 400 | 10 | 2 | 250 | 73 | 220 | 86 | 206 | 96 | 218 |
| *19 | 161 | 400 | 10 | 2 | 300 | 73 | 220 | 83 | 198 | 89 | 231 |
| 20 | 179 | 200 | 14 | 1.9 | 50 | 370 | 461 | 116 | 276 | 112 | 126 |
| 21 | 179 | 250 | 10 | 1.9 | 100 | 272 | 391 | 108 | 257 | 138 | 131 |
| 22 | 179 | 250 | 10 | 1.9 | 150 | 272 | 391 | 104 | 248 | 129 | 1138 |
| 23 | 179 | 300 | 10 | 1.9 | 100 | 222 | 321 | 105 | 250 | 131 | 154 |
| *24 | 179 | 300 | 10 | 1.9 | 250 | 222 | 321 | 94 | 225 | 104 | 182 |
| *25 | 179 | 300 | 10 | 1.9 | 300 | 222 | 321 | 90 | 216 | 95 | 194 |
| 26 | 179 | 350 | 8 | 1.9 | 100 | 146 | 251 | 101 | 237 | 116 | 168 |
| 27 | 179 | 350 | 10 | 1.9 | 100 | 172 | 251 | 104 | 241 | 152 | 180 |
| *28 | 179 | 350 | 8 | 1.9 | 150 | 146 | 251 | 95 | 228 | 96 | 178 |
| *29 | 179 | 350 | 14 | 1.9 | 250 | 220 | 251 | 97 | 226 | 120 | 252 |
| 30 | 199 | 300 | 8 | 1.8 | 150 | 240 | 282 | 104 | 243 | 184 | 173 |
| *31 | 199 | 300 | 6 | 1.8 | 250 | 216 | 282 | 92 | 218 | 137 | 193 |
| 32 | 199 | 350 | 14 | 1.8 | 200 | 256 | 212 | 105 | 243 | 173 | 274 |
| *33 | 199 | 350 | 14 | 1.8 | 300 | 256 | 212 | 93 | 225 | 98 | 304 |
| *34 | 199 | 400 | 18 | 1.8 | 300 | 247 | 142 | 98 | 230 | 164 | 491 |
| *35 | 223 | 350 | 14 | 1.7 | 250 | 285 | 173 | 104 | 241 | 186 | 335 |
| *36 | 223 | 350 | 14 | 1.7 | 300 | 285 | 173 | 96 | 231 | 128 | 356 |
| 37 | 252 | 150 | 6 | 1.6 | 150 | 436 | 414 | 121 | 291 | 117 | 131 |
| 38 | 252 | 200 | 6 | 1.6 | 100 | 386 | 344 | 123 | 295 | 121 | 145 |
| 39 | 252 | 200 | 6 | 1.6 | 150 | 386 | 344 | 117 | 282 | 109 | 156 |
| *40 | 252 | 400 | 6 | 1.6 | 200 | 186 | 64 | 95 | 225 | 162 | 332 |
| *41 | 252 | 400 | 16 | 1.6 | 250 | 273 | 64 | 106 | 248 | 173 | 558 |

*Examples outside the scope of the invention.

Table 1 shows that the total area (CATarea) when fins are present is at least double that of the reference block.

It should also be noted that in the blocks of the invention, the storage capacity is improved by 10% to 90% compared with the reference block.

Other tests have also shown the influence of positioning and form of the fins in the channels. Preferably, the internal fins of a channel, viewed in cross section, are in the form of an X, the ends of each of the four branches of the X each being in contact with a corner of that channel. That configuration corresponds to the embodiment shown in FIG. 5, which is the preferred embodiment.

The inventors have also discovered that poor dimensioning of the thickness of the fins results in a reduction in the mechanical strength of the structure and/or an increase in the pressure drop induced by passing through the filter block and/or a reduction in the filter area, as indicated in the results shown in the table above.

The inventors thus investigated the fin thickness offering the best compromise between mechanical strength, pressure drop and filter area. In particular, it proved to be desirable for the pressure drop to remain less than 2.2 times that of the reference block and for the filter area to be equal to or greater than that of the reference block.

Finally, the inventors discovered that it is preferable for the thickness Ea of a fin not to exceed a value MAX2 equal to (SI units):

$$0.39 \cdot p - 0.7 \cdot ((2 \cdot E_{pf}) - E_{pf}^2)$$

and/or, when the intermediate walls 40 separating the horizontal rows of adjacent channels and the vertical rows of adjacent channels have an undulating shape in cross section, a value MAX1 equal to (SI units):

$$p - E_{pf} - [420 \cdot p^2 / (1+A)]$$

in which:
- "$E_{pf}$" denotes the mean thickness of the filter walls of the channel comprising said fin, measured in meters;
- "p" is the pitch of the array of channels of the block, in meters;
- "A" denotes the degree of asymmetry.

Preferably, these two conditions are satisfied by at least one fin of the filter block, preferably by all of the fins of the filter block.

Further, Ea is preferably less than or equal to $E_{pf}$.

Clearly, the present invention is not limited to the embodiments described and shown above, provided by way of non-limiting illustration.

Thus, the invention also provides a monolithic filter block. The filter block may have any form, or any arrangement of channels.

The fins are preferably formed in one piece with the material of the walls of the channels on which they are fixed, but may also be adhered or inserted in said channels after forming a filter block using the prior art technique.

The thickness $E_{pf}$ of the filter walls of the channel in which the fin extends, measured in cross section, is preferably constant for all of these walls. Preferably, all of the filter walls of the filter block of the invention have an identical thickness. Preferably again, the thickness $E_{pf}$ is constant regardless of the plane of the cross section under consideration. These characteristics are not limiting, however.

Finally, the cross section of the channels is not limited to the forms described.

The invention claimed is:

1. A block for filtering particles contained in an exhaust gas from an internal combustion engine, comprising:
    imbricated sets of adjacent inlet channels and outlet channels, said inlet channels and outlet channels being disposed in an alternating manner to form a checkerboard pattern in section, an overall volume of said inlet channels being greater than an overall volume of said outlet channels,
    wherein an inside space of at least one of said inlet channels and said outlet channels includes one to four internal fin(s) and a thickness Ea of each internal fin, measured in meters in cross section, satisfies the following expressions:

$Ea \leq 0.39*p - 0.7*((2*E_{pf}) - E_{pf}^2)$, and $Ea \leq p - E_{pf} - [420*p^2/(1+A)]$ $E_{pf}$ denotes a mean thickness of filter walls of the channel including the fin, measured in meters in said cross section,
    p is a pitch of an array of channels of the block, measured in meters in said cross section, and
    A denotes a degree of asymmetry in said cross section.

2. The block according to claim 1, wherein each of said one to four fin(s) is substantially planar and extends in a substantially longitudinal plane.

3. The block according to claim 1, wherein each of said one to four fin(s) defines a continuous surface.

4. The block according to claim 1, wherein each of said one to four fin(s) is formed integrally with a material of a side wall of said channel.

5. The block according to claim 1, wherein said one to four fin(s) partitions said inside space.

6. The block according to claim 1, wherein said inside spaces of the inlet channels only include the one to four fin(s).

7. The block according to claim 1, comprising at least one intermediate wall separating two horizontal rows or two vertical rows of said channels, the intermediate wall having a cross-sectional shape that is sinusoidal.

8. The block according to claim 1, comprising at least one intermediate wall separating two horizontal rows or two vertical rows of said channels, the intermediate wall having a cross-sectional shape that is undulating.

9. The block according to claim 1, wherein the thickness Ea of each internal fin is less than or equal to the mean thickness $E_{pf}$ of the filter walls of the channel including said fin.

10. The block according to claim 1, wherein the one to four internal fin(s) comprise a plurality of fins extending from a junction line.

11. The block according to claim 10, wherein said plurality of fins are disposed in an equi-angular manner about the junction line.

12. The block according to claim 1, comprising four internal fins in a form of an X, when viewed in cross section, an end of each branch of the X being in contact with a corner of said channel.

13. A filter body for filtering particles, comprising at least one block according to claim 1.

14. The block according to claim 1, wherein all of the inside spaces of the inlet channels, but of the inlet channels only, include the one to four fin(s).

15. The block according to claim 12, wherein the all of the inside spaces of the inlet channels, but of the inlet channels only, include the four internal fins in the form of an X.

16. The block according to claim 15, wherein the four internal fins partition the inside space of the inlet channel into four portions of substantially equal volume.

17. The block according to claim 1, wherein the one to four internal fins comprise 1, 2 or 4 fins.

* * * * *